US012741541B2

(12) United States Patent
Shinozaki et al.

(10) Patent No.: US 12,741,541 B2
(45) Date of Patent: Sep. 22, 2026

(54) ELECTRIC VEHICLE DIAGNOSTIC APPARATUS

(71) Applicant: SUBARU CORPORATION, Tokyo (JP)

(72) Inventors: Tomoki Shinozaki, Tokyo (JP); Takuya Takashima, Tokyo (JP); Hiroto Asai, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 280 days.

(21) Appl. No.: 18/319,063

(22) Filed: May 17, 2023

(65) Prior Publication Data

US 2023/0391197 A1 Dec. 7, 2023

(30) Foreign Application Priority Data

Jun. 2, 2022 (JP) ................................ 2022-089986

(51) Int. Cl.
*B60L 3/00* (2019.01)
*G07C 5/08* (2006.01)

(52) U.S. Cl.
CPC .......... *B60L 3/0038* (2013.01); *G07C 5/0808* (2013.01); *B60L 2240/425* (2013.01); *B60L 2240/525* (2013.01)

(58) Field of Classification Search
CPC ............. B60L 3/0038; B60L 2240/425; B60L 2240/525; G07C 5/0808
USPC ........................................................... 701/22
See application file for complete search history.

(56) References Cited

U.S. PATENT DOCUMENTS 5,995,887 A * 11/1999 Hathaway .............. G01K 15/00 701/30.6
8,244,427 B2 * 8/2012 Weiss .................. G01K 15/007 701/30.7
2014/0185647 A1 7/2014 Kinoshita
2014/0358391 A1 12/2014 Kakihara
2016/0137192 A1 * 5/2016 Wu .................. B60W 30/1843 701/99
(Continued)

FOREIGN PATENT DOCUMENTS

CN 111865186 A * 10/2020 ............. H02P 29/68
JP 2003-286888 A 10/2003
(Continued)

OTHER PUBLICATIONS

Ji et al., Nonlinear Fault Diagnosis based on RBF with Sliding Window Error Feedback, IEEE, Jul. 2007 (Year: 2007).*
(Continued)

*Primary Examiner* — Hitesh Patel
*Assistant Examiner* — Austin Robert Chennault
(74) *Attorney, Agent, or Firm* — Rimon P.C.

(57) ABSTRACT

An electric vehicle diagnostic apparatus to be installed in an electric vehicle including a temperature sensor configured to detect a temperature of a drive motor or a temperature of an inverter configured to drive the drive motor includes a controller. The controller is configured to make a diagnosis of the temperature sensor. The controller is configured to perform mask processing in which the diagnosis is not made at system startup of the electric vehicle. The controller is configured to switch a length of time of the mask processing in accordance with a condition.

2 Claims, 6 Drawing Sheets

(56) References Cited

U.S. PATENT DOCUMENTS

| | | | | |
|---|---|---|---|---|
| 2016/0273975 | A1* | 9/2016 | Tano | G01K 15/007 |
| 2017/0357808 | A1* | 12/2017 | Arroyo | G06F 21/57 |
| 2018/0065486 | A1 | 3/2018 | Kasagi et al. | |
| 2018/0079311 | A1 | 3/2018 | Ichikawa et al. | |

FOREIGN PATENT DOCUMENTS

| | | | |
|---|---|---|---|
| JP | 2014-142056 | A | 8/2014 |
| JP | 2014-233194 | A | 12/2014 |
| JP | 2016-195515 | A | 11/2016 |
| JP | 2017-100482 | A | 6/2017 |
| JP | 2018-042368 | A | 3/2018 |
| JP | 2019-022308 | A | 2/2019 |
| JP | 2020-038076 | A | 3/2020 |

OTHER PUBLICATIONS

Daass et al., An adaptive threshold for change detection methods using a windowed entropy-based criterion—Application to fault-tolerant fusion in collaborative mobile robotics, Oct. 2019, IEEE (Year: 2019).*

Azzoug et al., Current sensors fault detection and tolerant control strategy for three-phase induction motor drives, Oct. 2020, Springer, Electrical Engineering Issue 103 pp. 881-898 (Year: 2020).*

Ni et at., Sensor Network Data Fault Types, Jun. 2009, Association for Computing Machinery, ACM Trans. Sen. Netw. vol. 5 No. 3, pp. 1-29 (Year: 2009).*

Daass et al., “An adaptive threshold for change detection methods using a windowed entropy-based criterion—Application to fault-tolerant fusion in collaborative mobile robotics” (Year: 2019).*

Jia et al., “Nonlinear Fault Diagnosis based on RBF with Sliding Window Error Feedback” (Year: 2006).*

Notice of Reasons for Refusal issued in corresponding Japanese Patent Application No. 2022-089986, dated Jan. 6, 2026.

* cited by examiner

DETECTED VALUE OF FIRST PHASE
DETECTED VALUE OF SECOND PHASE
MASK PROCESSING
DIAGNOSTIC PROCESSING
TIME
TIME
t0
t1
t2
T10
T11
T2
T3
DETECTED TEMPERATURE VALUE
DIAGNOSTIC OPERATION

DETECTED VALUE OF FIRST PHASE
DETECTED VALUE OF SECOND PHASE
MASK PROCESSING
DIAGNOSTIC PROCESSING
TIME
TIME
t0
t1
t2
T1
T11
T3
DETECTED TEMPERATURE VALUE
DIAGNOSTIC OPERATION

ELECTRIC VEHICLE DIAGNOSTIC APPARATUS

CROSS-REFERENCE TO RELATED APPLICATIONS

The present application claims priority from Japanese Patent Application No. 2022-089986 filed on Jun. 2, 2022, the entire contents of which are hereby incorporated by reference.

BACKGROUND

The disclosure relates to an electric vehicle diagnostic apparatus.

Japanese Unexamined Patent Application Publication No. 2018-042368 describes a malfunction detection apparatus that performs a malfunction determination of a temperature sensor installed in a vehicle. The temperature sensor is configured to detect the temperature of a power element of an inverter. In a case where the difference between detected values from an adjacent pair of temperature sensors being greater than a determination value continues in a case where motor rotation speed being greater than a threshold is maintained, the above-described malfunction detection apparatus determines that the temperature sensor has malfunctioned.

SUMMARY

An aspect of the disclosure provides an electric vehicle diagnostic apparatus to be installed in an electric vehicle including a temperature sensor configured to detect a temperature of a drive motor or a temperature of an inverter configured to drive the drive motor, the electric vehicle diagnostic apparatus including a controller. The controller is configured to make a diagnosis of the temperature sensor. The controller performs mask processing in which the diagnosis is not made at system startup of the electric vehicle. The controller switches a length of time of the mask processing in accordance with a condition.

BRIEF DESCRIPTION OF THE DRAWINGS

The accompanying drawings are included to provide a further understanding of the disclosure and are incorporated in and constitute a part of this specification. The drawings illustrate embodiments and, together with the specification, serve to describe the principles of the disclosure.

DETAILED DESCRIPTION

In an electric vehicle, motor lock may occur. Motor lock refers to a state in which torque is generated in a drive motor, and the rotation of the drive motor is stopped or almost stopped. When motor lock occurs, one phase current continuously flows through the drive motor and an inverter. Devices of a motor coil and an inverter through which the phase current flows generate greater amounts of heat than devices of motor coils and inverters through which other phase currents flow. Thus, in a case where diagnoses of temperature sensors are made in a case where motor lock has occurred, differences between detected values from the temperature sensors may be large even when the temperature sensors are normal. As a result, there may be a case where a correct diagnostic result is not obtained. Thus, in a case where motor lock has occurred, a measure is to be taken in diagnostic processing for temperature sensors.

At system startup of the electric vehicle, for example, a vehicle state immediately before startup is difficult to grasp. Thus, even in a case where motor lock has occurred immediately before system startup, a diagnostic apparatus usually cannot recognize such motor lock. In contrast, immediately after system startup of the electric vehicle, a temperature change appropriate for making a diagnosis of a temperature sensor often occurs. For example, such temperature changes are significant increases in temperatures of the drive motor and the inverter from low values when the electric vehicle pulls away.

It is desirable to provide an electric vehicle diagnostic apparatus that can make appropriate diagnoses of temperature sensors configured to detect the temperature of a drive motor or that of an inverter.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
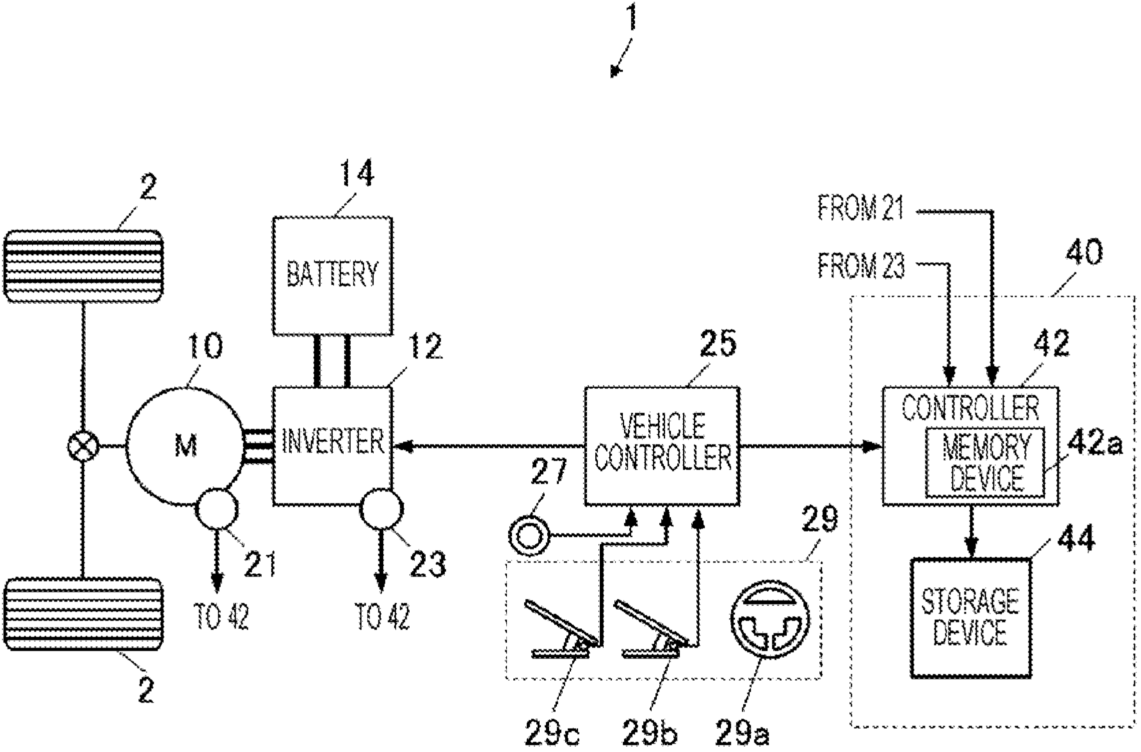
FIG. 1 is a block diagram illustrating an electric vehicle and a diagnostic apparatus according to an embodiment of the disclosure.

FIG. 1 is a block diagram illustrating an electric vehicle and a diagnostic apparatus according to the embodiment of the disclosure. An electric vehicle 1 according to the present embodiment includes driving wheels 2, a drive motor 10, an inverter 12, a battery 14, a temperature sensor 21, a temperature sensor 23, a vehicle controller 25, a power switch (a power button, a key cylinder, or the like) 27, and a driving operation unit 29. The drive motor 10 generates power for the driving wheels 2. The inverter 12 drives the drive motor 10. The battery 14 supplies power to the drive motor 10. The temperature sensor 21 is configured to detect the temperature of the drive motor 10. The temperature sensor 23 is configured to detect the temperature of the inverter 12. The vehicle controller 25 controls the inverter 12 in accordance with a driving command. The power switch 27 switches between startup and non-operation of the system of the electric vehicle 1. The driving operation unit 29 is operated by a driver.

The driving operation unit 29 includes, for example, a steering unit 29*a*, an accelerator operation unit 29*b*, and a brake operation unit 29*c*. By operating the driving operation unit 29, a driving command (a signal indicating the amount of operation) is sent from the driving operation unit 29 to the vehicle controller 25. Note that the driving operation unit 29 may be configured to be operated by not the driver but an autonomous driving system.

The vehicle controller 25 controls the inverter 12 in accordance with, for example, an operation performed on the accelerator operation unit 29*b* and the brake operation unit 29*c* to cause the drive motor 10 to perform power running or a regenerative operation. Rotation information regarding the drive motor 10 is fed back to the vehicle controller 25. Thus, the vehicle controller 25 can detect occurrence of motor lock from the rotation information and the control state of the inverter 12. Motor lock refers to a state in which torque is generated in the drive motor 10, and rotation of the drive motor is stopped or almost stopped.

The electric vehicle 1 further includes a diagnostic apparatus 40. The diagnostic apparatus 40 makes diagnoses of individual constituent units of the electric vehicle 1 and records diagnostic results. Diagnoses that the diagnostic apparatus 40 makes include at least diagnoses of the temperature sensors 21 and 23 as to whether the temperature sensors 21 and 23 are normal or abnormal. The diagnoses may be called malfunction determination diagnoses of the temperature sensors 21 and 23.

The diagnostic apparatus 40 is started up together with the vehicle controller 25 at system startup of the electric vehicle 1 on the basis of an operation performed on the power switch 27 of the electric vehicle 1, and is stopped when the system of the electric vehicle 1 is stopped.

The diagnostic apparatus 40 includes a controller 42 and a storage device 44. The controller 42 performs diagnostic processing. The storage device 44 records diagnostic results. The controller 42 is a computer that executes a program of diagnostic processing. The controller 42 includes a memory device 42*a*, in which the program of diagnostic processing is stored. The storage device 44, in which the diagnostic results are recorded, may be provided inside the controller 42.

The controller 42 receives outputs from the temperature sensors 21 and 23 and motor lock information, with which it can be recognized that motor lock has occurred in the drive motor 10. The motor lock information may be sent from the vehicle controller 25 when the vehicle controller 25 detects motor lock. Alternatively, the motor lock information may be generated inside the controller 42. That is, the controller 42 receives rotation information and current information regarding the drive motor 10, and determines presence or absence of motor lock from the information. In a case where the controller 42 determines that motor lock has occurred, the controller 42 may generate motor lock information therein.

By receiving motor lock information, the controller 42 can recognize that motor lock has occurred during system startup. In contrast, even immediately after occurrence of motor lock, once the system of the electric vehicle 1 has stopped and then started up again, it is difficult for the controller 42 to recognize that motor lock has occurred immediately before system startup.

Figure 2:
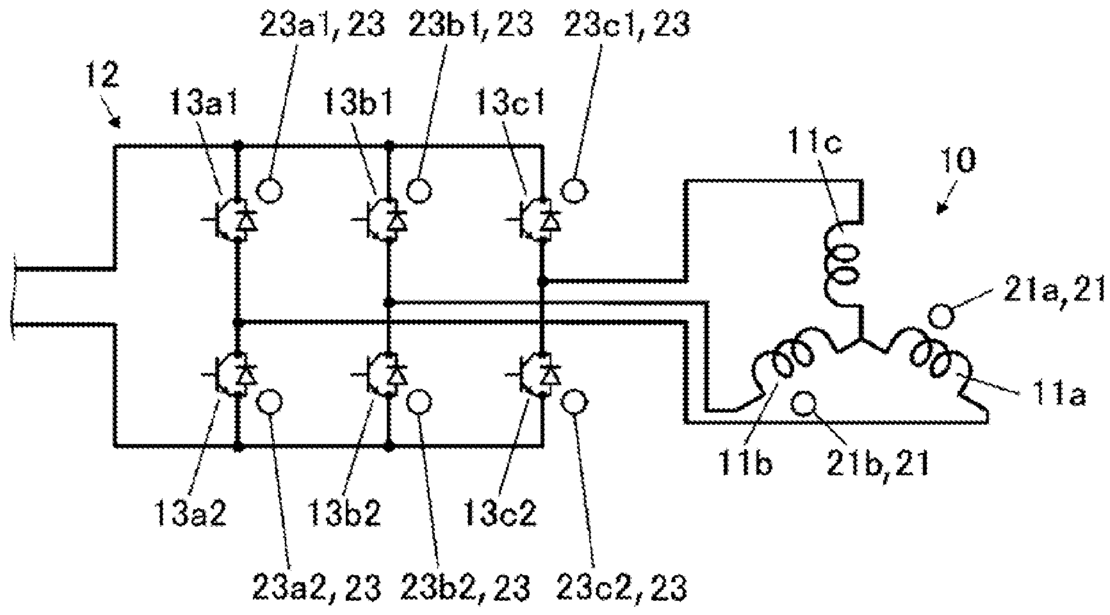
FIG. 2 is a diagram illustrating details of a drive motor and an inverter illustrated in FIG. 1.

FIG. 2 is a diagram illustrating details of the drive motor and the inverter illustrated in FIG. 1.

The drive motor 10 is a three-phase motor and has three coils 11*a* to 11*c* through which three-phase currents flow in a respective manner.

The temperature sensor 21 includes a first temperature sensor device 21*a* and a second temperature sensor device 21*b* configured to detect temperatures of the two coils 11*a* and 11*b*. The first temperature sensor device 21*a* is configured to detect the temperature of the coil 11*a* by being disposed near the coil 11*a* or along a heat conduction path of the coil 11*a*. The second temperature sensor device 21*b* is configured to detect the temperature of the coil 11*b* by being disposed near the coil 11*b* or along a heat conduction path of the coil 11*b*.

Note that FIG. 2 illustrates an example in which the temperature sensor 21 includes two temperature sensor devices (21*a*, 21*b*). However, the temperature sensor 21 may include three or more temperature sensor devices, and may be configured to detect temperatures of the three coils 11*a* to 11*c*, through which three-phase currents flow, in a respective manner.

The inverter 12 includes six elements 13*a*1 to 13*c*2, through which three-phase currents flow. The elements 13*a*1 to 13*c*2 are, for example, power semiconductor devices such as an insulated gate bipolar transistor (IGBT).

The temperature sensor 23 includes six temperature sensor devices 23*a*1 to 23*c*2, which are configured to detect temperatures of the six elements 13*a*1 to 13*c*2, in a respective manner. The temperature sensor devices 23*a*1 to 23*c*2 are configured to detect, in a respective manner, the temperatures of the elements 13*a*1 to 13*c*2 serving as temperature detection targets by being disposed near the individual elements 13*a*1 to 13*c*2 or along heat conduction paths of the individual elements 13*a*1 to 13*c*2.

Note that FIG. 2 illustrates an example in which the temperature sensor 23 includes the six temperature sensor devices 23*a*1 to 23*c*2 corresponding to the six elements 13*a*1 to 13*c*2, respectively. However, the temperature sensor 23 may have a configuration including two or more temperature sensor devices configured to detect temperatures of two or more elements through which currents of two or more different phases flow.

Diagnostic Processing

The controller 42 makes diagnoses of the individual units of the electric vehicle 1 and records diagnostic results in the storage device 44. The controller 42 makes diagnoses of the temperature sensors 21 and 23 as some of the diagnoses. Diagnostic items of the temperature sensors 21 and 23 include items of "break", "fixation (coupling a terminal or a wiring line to an unexpected potential point)", "shift", and "linearity". For the diagnostic items, presence or absence of a break, presence or absence of fixation, presence or absence of a shift abnormality, and presence or absence of a linearity are each determined.

Diagnostic methods for a break, fixation, shift, and linearity are as follows. Break: The controller 42 determines that there is a break in a case where either of outputs from the temperature sensors 21 and 23 is missing. Fixation: The controller 42 determines that fixation has occurred in a case where either of outputs from the temperature sensors 21 and 23 is fixed at an abnormal output (an output outside the output range of temperature).

Shift: A shift abnormality refers to an abnormality in which an output is shifted from a standard value at a reference temperature, the output being at the standard value at the reference temperature when the output is normal. The output refers to an output from each of the temperature sensors 21 and 23. The controller 42 compares outputs from the first temperature sensor device 21*a* and the second temperature sensor device 21*b* of the temperature sensor 21 of the drive motor 10 with each other. In a case where there is a certain difference, and the difference continues under a predetermined condition, the controller 42 determines that there is a shift abnormality. Similarly, the controller 42 compares outputs from the temperature sensor devices **23*a*1 to 23*c*2 of the temperature sensor 23 of the inverter 12 with each other. In a case where any one of the differences has a certain value, and the difference continues under a predetermined condition, the controller 42 determines that there is a shift abnormality. The above-described predetermined condition is, for example, a condition that an output difference being greater than or equal to a threshold set in advance continues longer than a threshold time set in advance. Note that the above-described predetermined condition may be any condition as long as a shift abnormality can be determined in a period in which the drive motor 10** is normally driven.

Linearity: A linearity abnormality refers to an abnormality in which a value representing (the amount of change in output)/(the amount of change in temperature) is shifted from a predetermined coefficient, the value representing (the amount of change in output)/(the amount of change in temperature) being the predetermined coefficient when outputs are normal. The output refers to an output from each of the temperature sensors 21 and 23. The controller 42 monitors outputs from the first temperature sensor device **21*a* and the second temperature sensor device 21*b* in a period in which both outputs change under a first change condition. The controller 42 determines that there is a linearity abnormality in a case where a difference between the rates of change of these outputs matches a first determination condition. Similarly, the controller 42 monitors outputs from the temperature sensor devices 23*a*1 to 23*c*2 in a period in which the outputs change under a second change condition. The controller 42 determines that there is a linearity abnormality in a case where any one of differences between the rates of change in these outputs matches a second determination condition. The first change condition and the second change condition described above are, for example, conditions that a detected temperature value increases from a first set temperature or from below the first set temperature to a second set temperature or to above the second set temperature. The first determination condition and the second determination condition described above are, for example, conditions that the difference between the rates of change in output is greater than or equal to a threshold set in advance. Note that the first determination condition and the second determination condition may each be any condition as long as a linearity abnormality can be determined in a period in which the drive motor 10** is normally driven. An "output" from a temperature sensor device may be called a "detected temperature value" from the temperature sensor device instead.

Measures for Abnormal Driving of Drive Motor

While the electric vehicle 1 is driving, when the drive motor 10 is abnormally driven (for example, motor lock), a specific phase current flows more through the drive motor 10 and the inverter 12. There may be a case where the temperatures of the coil **11*a* and the coil 11*b* are shifted away from each other. In addition, there may be a case where, out of the elements 13*a*1 to 13*c*2 of the inverter 12, the temperature of an element through which a current flows and the temperature of an element through which a current does not flow may be shifted away from each other. In these cases, even when the temperature sensor 21 is normal, the difference between an output from the first temperature sensor device 21*a* and an output from the second temperature sensor device 21*b* is large for a while. Furthermore, a difference occurs between the rate of change in output from the first temperature sensor device 21*a* and that from the second temperature sensor device 21*b*. Similarly, the differences between outputs from the temperature sensor devices 23*a*1 to 23*c*2 and the differences between the rates of change in output are large for a while. Thus, when measures are not taken, the controller 42** may confuse such a case with a shift abnormality or a linearity abnormality.

Thus, in a case where the controller 42 receives information that enables motor lock to be recognized, the controller 42 performs mask processing in which neither a shift diagnosis nor a linearity diagnosis is made. After a predetermined time has elapsed since release of motor lock (for example, 240 s), the controller 42 terminates the mask processing.

Motor lock may have occurred immediately before system startup of the electric vehicle 1, and it is difficult for the controller 42 to confirm presence or absence of motor lock at system startup. Thus, the controller 42 performs mask processing also at system startup.

Note that at system startup, since the electric vehicle 1 pulls away, the temperatures of the drive motor 10 and the inverter 12 may increase relatively significantly from low values. Such temperature changes are suitable for making linearity diagnoses of the temperature sensors 21 and 23. Once the temperatures of the drive motor 10 and the inverter 12 increase, there are less opportunities thereafter for a temperature change enabling a linearity diagnosis to be made to occur.

Thus, the controller 42 switches, depending on conditions, the length of time of mask processing performed at system startup. In one example, in a situation in which large differences occur between outputs from the temperature sensor 21 of the drive motor 10 even when the temperature sensor 21 is normal, the controller 42 sets the length of time of mask processing to a first length of time. In contrast, in a situation in which large differences do not occur between the outputs when the temperature sensor 21 is normal, the controller 42 sets the length of time of mask processing to a second length of time, which is shorter than the first length of time.

Similarly, in a situation in which large differences occur between outputs from the temperature sensor 23 of the inverter 12 even when the temperature sensor 23 is normal, the controller 42 sets the length of time of mask processing to the first length of time. In contrast, in a situation in which large differences do not occur between the outputs when the temperature sensor 23 is normal, the controller 42 sets the length of time of mask processing to the second length of time, which is shorter than the first length of time.

By switching the length of time of mask processing as described above, the controller 42 can help to prevent a determination of a shift abnormality or a linearity abnormality from being made even when the temperature sensors 21 and 23 are normal. Furthermore, the controller 42 can have an effect in that a longer time can be ensured as a diagnostic time regarding linearity.

The controller 42 may switch, on the basis of outputs from the temperature sensor 21 of the drive motor 10, the length of time of mask processing performed at system startup. In one example, the controller 42 may switch the length of time of the above-described mask processing on the basis of the level of discrepancy between an output from the first temperature sensor device **21*a* and an output from the second temperature sensor device 21*b***.

The controller 42 may switch, on the basis of outputs from the temperature sensor 23 of the inverter 12, the length of time of mask processing performed at system startup. In one example, the controller 42 may switch the length of time of the above-described mask processing on the basis of the level of discrepancy between an output representing the temperature of an element through which a certain phase current flows and an output representing the temperature of an element through which a phase current other than the above-described phase current flows out of the temperature sensor devices 23_a_1 to 23_c_2.

In this case, since an output from the first temperature sensor device 21_a_ and an output from the second temperature sensor device 21_b_ represent the temperatures of the coils 11_a_ and 11_b_ through which two different phase currents flow, and thus the outputs can be called two-phase detected values. When these names are used, it can be said that, in other words, the controller 42 switches the length of time of the above-described mask processing on the basis of the level of discrepancy between detected values of different phases among detected values from the temperature sensor 21.

Similarly, outputs from the temperature sensor devices 23_a_1 to 23_c_2 represent the temperatures of pairs of elements through which three different phase currents flow, and thus the outputs may be classified into three and can be called three-phase detected values. When these names are used, it can be said that, in other words, the controller 42 switches the length of time of the above-described mask processing on the basis of the level of discrepancy between detected values of different phases among detected values from the temperature sensor 23.

In a case where the above-described level of discrepancy is obtained from two-phase detected values (for example, an output from the first temperature sensor device 21_a_ and an output from the second temperature sensor device 21_b_), it is sufficient that the controller 42 calculate the difference between the two-phase detected values as the above-described level of discrepancy. In a case where two-phase detected values are acquired over a certain period (a few hundred milliseconds to a few seconds), the controller 42 may calculate the difference between two-phase detected values obtained at any timing in the period as the level of discrepancy. Alternatively, the controller 42 may calculate the difference between values subjected to statistical processing as the above-described level of discrepancy. For example, the controller 42 may calculate, as the above-described level of discrepancy, the difference between the average of detected values of a certain phase in the period and the average of detected values of another phase in the period.

In a case where the above-described level of discrepancy is obtained from three-phase detected values (for example, outputs from the temperature sensor devices 23_a_1 to 23_c_2), it is sufficient that the controller 42 calculate, as the level of discrepancy, the difference between the maximum value and the minimum value among the three-phase detected values. Alternatively, the controller 42 may calculate, as the level of discrepancy, the difference between the average of the three-phase detected values and the detected value farthest from the average. In a case where three-phase detected values are acquired over a certain period (a few hundred milliseconds to a few seconds), the controller 42 may calculate the above-described level of discrepancy using three-phase detected values obtained at any timing in the period. Alternatively, the controller 42 may calculate the above-described level of discrepancy using values obtained by performing statistical processing on each of the three-phase detected values in the period. In addition, any value may be calculated as the above-described level of discrepancy as long as the degree to which the three-phase detected values are apart from each other can be determined using the value.

For switching the length of time of mask processing on the basis of the above-described level of discrepancy, in a case where motor lock has occurred immediately before system startup, mask processing is performed for the first length of time, which has a long duration, at system startup. This can help to prevent an erroneous result from being acquired in diagnostic processing. In contrast, in a case where motor lock has not occurred immediately before system startup, mask processing is performed for the second length of time, which has a short duration, at system startup. Thus, the diagnostic apparatus 40 can ensure many diagnostic opportunities for a temperature change appropriate for making a linearity diagnosis to occur.

Moreover, for switching the length of time of the above-described mask processing, the controller 42 switches the length of time of mask processing on the basis of outputs from the temperature sensors 21 and 23. Thus, the controller 42 does not use an additional signal input in order to switch the above-described length of time, so that simple processing for switching the length of time can be realized.

Procedure of Diagnostic Processing for Temperature Sensor

Figure 3:
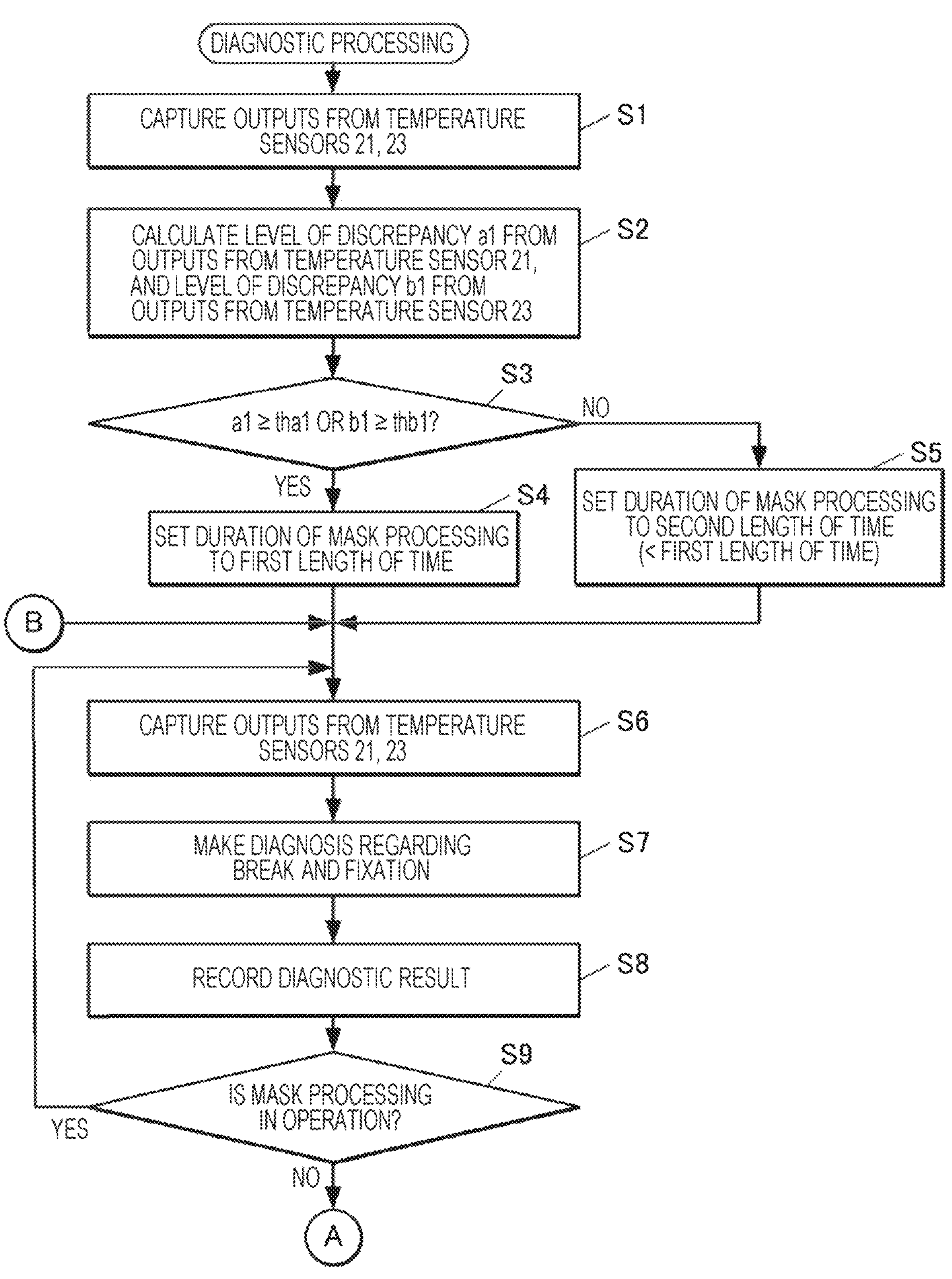
FIG. 3 is a flow chart illustrating diagnostic processing that a controller of the diagnostic apparatus performs.
Figure 4:
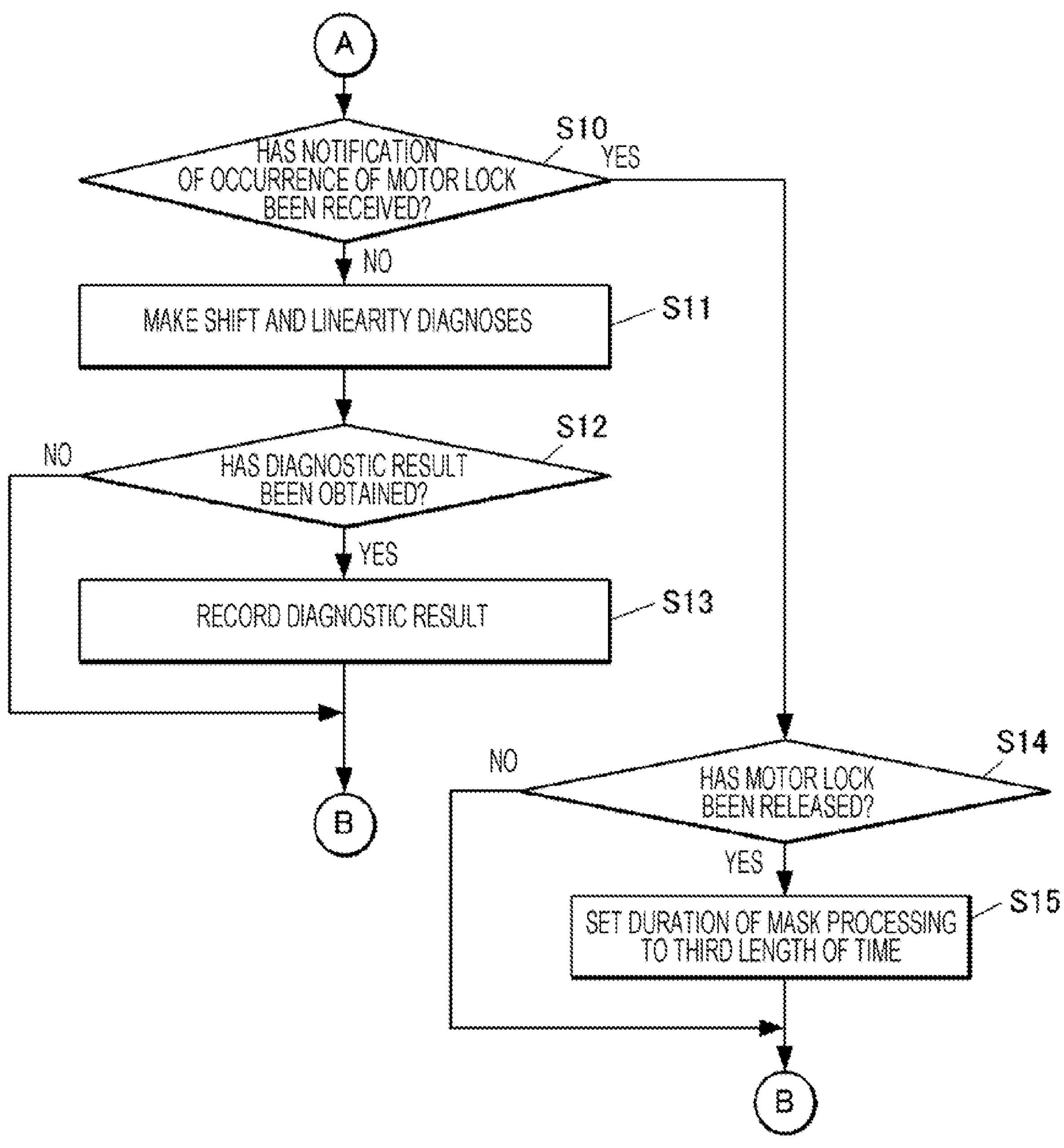
FIG. 4 illustrates part of the flow chart illustrating the diagnostic processing.

Next, an example of the procedure of diagnostic processing for the temperature sensors 21 and 23 will be described. FIGS. 3 and 4 are flow charts illustrating diagnostic processing that the controller of the diagnostic apparatus performs.

The diagnostic processing is started at system startup of the electric vehicle 1. When the diagnostic processing is started, the controller 42 captures outputs from the temperature sensors 21 and 23 (Step S1). The controller 42 calculates, from the outputs, a level of discrepancy al of two-phase detected values from the temperature sensor 21 and a level of discrepancy b1 of three-phase detected values from the temperature sensor 23 (Step S2). Furthermore, the controller 42 determines whether the level of discrepancy al is greater than or equal to a threshold tha1, or the level of discrepancy b1 is greater than or equal to a threshold thb1 (Step S3). In a case where YES is obtained, the duration of mask processing is set to the first length of time, which has a long duration (for example, 120 s to 160 s) (Step S4). In contrast, in a case where NO is obtained, the duration of mask processing is set to the second length of time, which is shorter than the first length of time (for example, 45 s to 55 s) (Step S5).

Subsequently, the controller 42 captures outputs from the temperature sensors 21 and 23 (Step S6), and performs, on the basis of the captured outputs, diagnostic processing regarding a break and fixation of the temperature sensors 21 and 23 (Step S7). The controller 42 records a diagnostic result in the storage device 44 (Step S8).

Furthermore, the controller 42 determines whether mask processing is in operation (Step S9). When the controller 42 determines that mask processing is in operation, the process simply returns to Step S6.

In contrast, in a case where it is determined in Step S9 that mask processing is not in operation, the controller 42 determines whether a notification of occurrence of motor lock (motor lock information) has been received (Step S10).

As a result of the determination in Step S10, in a case where the notification has not been received, the controller 42 makes shift and linearity diagnoses on the basis of the outputs captured in Step S6 (Step S11).

In order to make shift and linearity diagnoses, outputs from the temperature sensors 21 and 23 over a predetermined period are to be used. Thus, by performing Step S10 multiple times repeatedly in loop processing, the controller 42 accumulates outputs from the temperature sensors 21 and 23 over a predetermined continuous period. Furthermore, the controller 42 determines whether the accumulated outputs satisfy a condition necessary for making diagnoses (for example, the condition that there is a predetermined increase in temperature). In a case where the condition is satisfied, the controller 42 make shift and linearity diagnoses on the basis of the outputs.

Thereafter, when a diagnostic result is obtained (YES in Step S12), the controller 42 records the diagnostic result in the storage device 44 (Step S13). The controller 42 then causes the process to return to Step S6.

In a case where it is determined in Step S10 that motor lock information has been received, the controller 42 determines whether motor lock has been released (Step S14). In a case where motor lock has not been released, the process simply returns to Step S6. In contrast, in a case where motor lock has been released, the controller 42 sets the duration of mask processing to a third length of time (for example, 240 s) (Step S15). The controller 42 then causes the process to return to Step S6. The third length of time may be longer than the first length of time and the second length of time.

Through such diagnostic processing, diagnoses of the temperature sensors 21 and 23 can be made, mask processing for diagnosis can be performed, and the length of time of mask processing can be switched.

Note that in the diagnostic processing illustrated in FIGS. 3 and 4, an example has been described in which in a case where the level of discrepancy between detected values from either one of the temperature sensors 21 and 23 is greater than or equal to a corresponding threshold, the duration of mask processing immediately after system startup is set to the first length of time, which is long. However, the controller 42 may set the duration of mask processing immediately after system startup to the first length of time, which is long, in a case where the levels of discrepancy between detected values from both the temperature sensors 21 and 23 are greater than or equal to corresponding thresholds. Moreover, in a case where mask processing for the temperature sensor 21 and mask processing for the temperature sensor 23 are performed in a separate manner, the first length of time of mask processing for the temperature sensor 21 may have a different value from the first length of time of mask processing for the temperature sensor 23. Similarly, the second length of time of mask processing for the temperature sensor 21 may have a different value from the second length of time of mask processing for the temperature sensor 23.

A program of the above-described diagnostic processing is stored in a non-transitory computer readable medium such as the memory device 42*a* of the controller 42. The controller 42 may load a program stored in a portable non-transitory recording medium, and may be configured to execute the program. The above-described portable non-transitory recording medium may store a program of the above-described diagnostic processing.

Operation Example of Diagnostic Processing for Temperature Sensors 21 and 23

Figure 5:
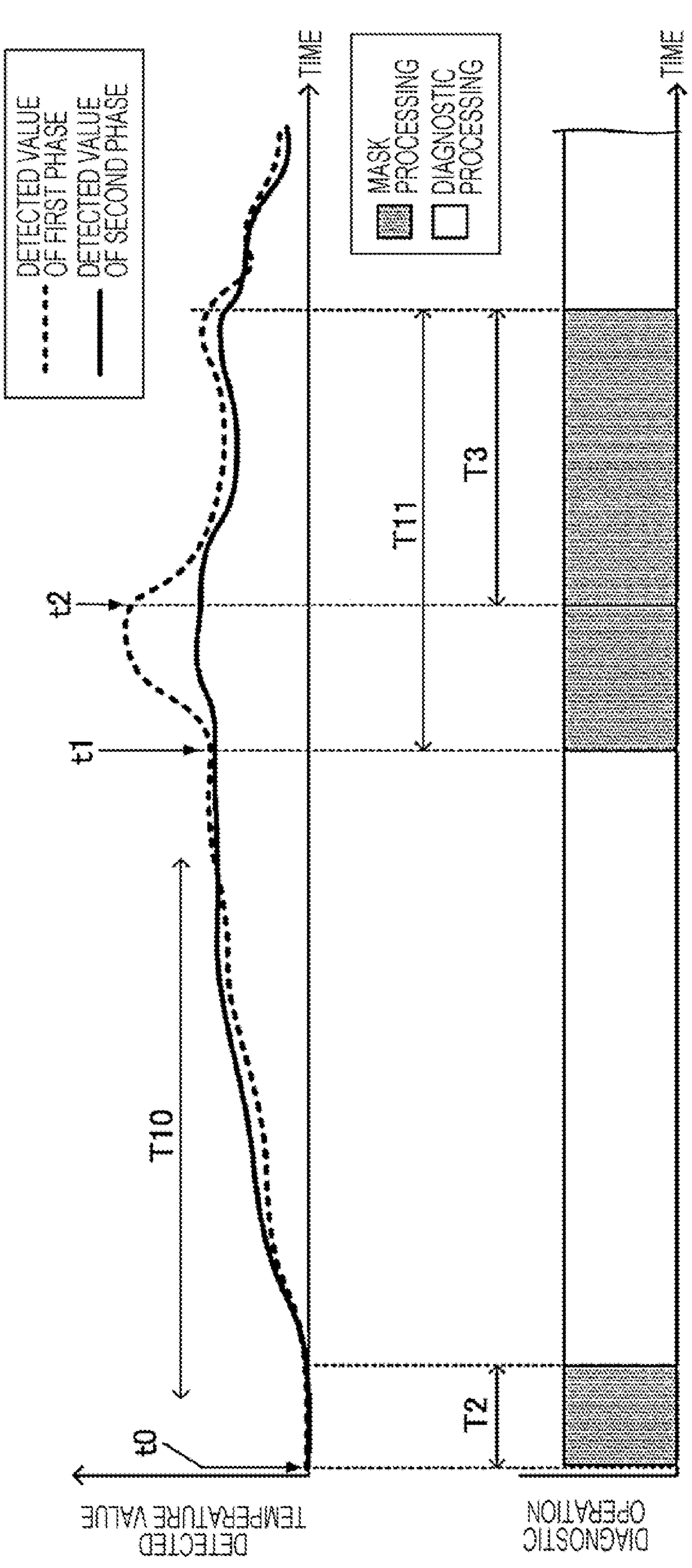
FIG. 5 is a timing diagram illustrating an example of diagnostic processing.
Figure 6:
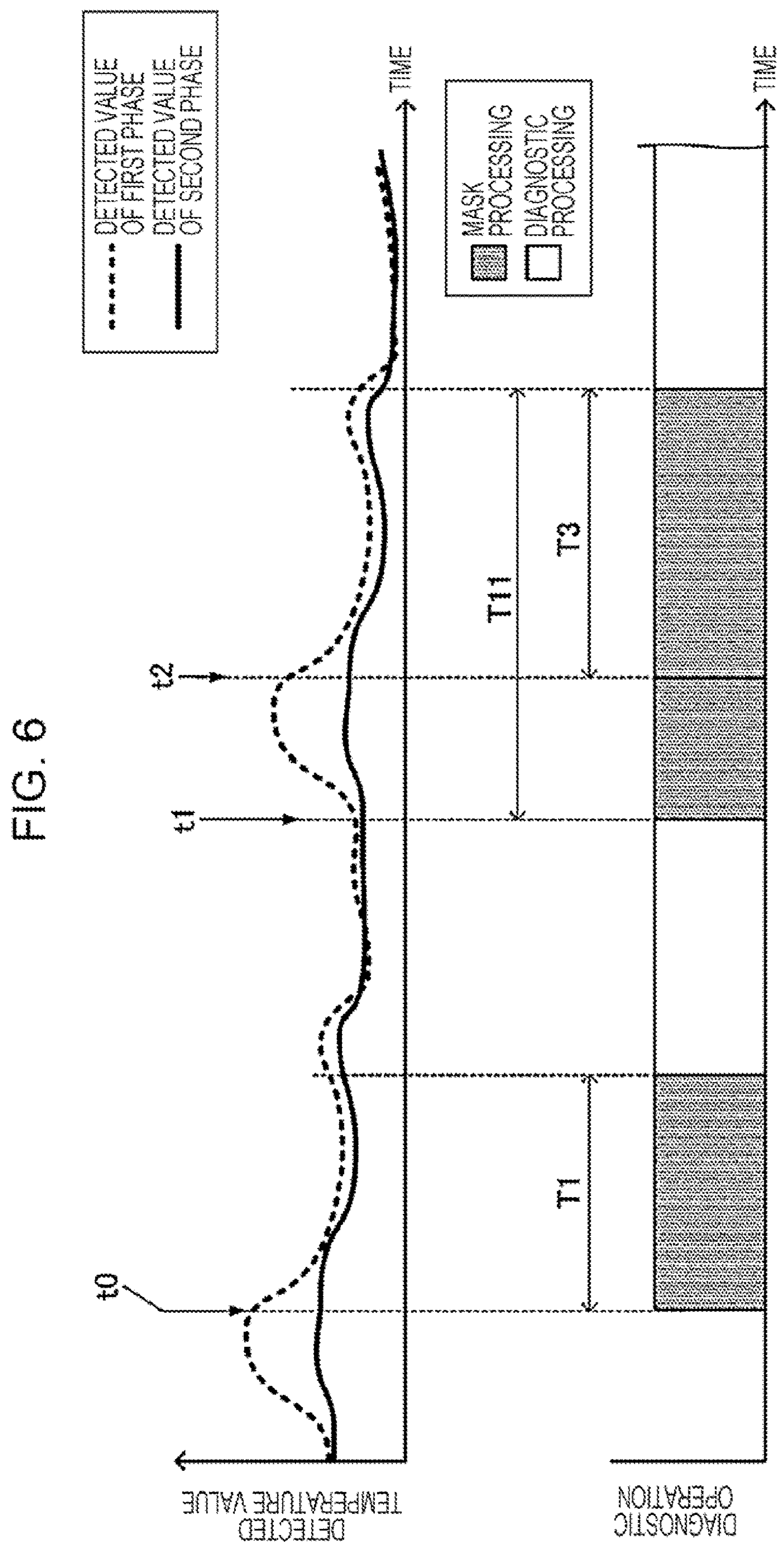
FIG. 6 is a timing diagram illustrating an example of diagnostic processing.

FIGS. 5 and 6 are timing diagrams illustrating a first example and a second example of diagnostic processing in a respective manner. FIGS. 5 and 6 illustrate the operation of diagnostic processing regarding the shift and linearity of the temperature sensors 21 and 23.

FIG. 5 illustrates a case where abnormal driving such as motor lock has not occurred in the drive motor 10 immediately before a system startup time t0. In this case, in a case where the temperature sensors 21 and 23 do not have abnormalities, detected values of different phases from the temperature sensor 21 almost match each other at the system startup time t0. Similarly, detected values of different phases from the temperature sensor 23 almost match each other at the system startup time t0. As a result, the controller 42 sets the duration of mask processing performed at system startup to a second length of time T2, which is short. Thus, the controller 42 can perform shift and linearity diagnostic processing in the greater portion of a temperature rise period T10 immediately after system startup, and can ensure a long time as a diagnostic time for making shift and linearity diagnoses.

FIG. 6 illustrates a case where abnormal driving such as motor lock has occurred in the drive motor 10 immediately before the system startup time t0. In this case, in a case where the temperature sensors 21 and 23 do not have abnormalities, there is a discrepancy greater than or equal to a threshold between detected values of different phases from the temperature sensor 21 or the temperature sensor 23 at the system startup time t0. As a result, the controller 42 sets the duration of mask processing performed at system startup to a first length of time T1, which is long. Thus, the controller 42 does not perform shift and linearity diagnostic processing during a period of the first length of time T1, and can help to prevent an erroneous diagnosis from being made due to the discrepancies between the detected values from the temperature sensors 21 and 23 due to motor lock that has occurred immediately before system startup.

In both FIGS. 5 and 6, in a case where motor lock occurs at a certain time t1 while the system is in operation, the controller 42 does not perform diagnostic processing in a period T11 starting from occurrence of the motor lock and can thus help to prevent an erroneous diagnosis from being made. In a case where the motor lock is released at a time t2, the period T11 starts from occurrence of motor lock (the time t1), and continues until a set third length of time T3 has elapsed from the time t2.

As described above, the controller 42 of the diagnostic apparatus 40 according to the present embodiment performs mask processing in which predetermined diagnoses of the temperature sensors 21 and 23 are not made at system startup of the electric vehicle 1. Furthermore, the controller 42 can switch the length of time of mask processing. Thus, in response to a case where motor lock has occurred immediately before system startup, the controller 42 can help to prevent, by performing mask processing, an erroneous diagnosis from being made. Furthermore, the controller 42 changes the length of time of mask processing in accordance with conditions. Thus, in a case where it is estimated that motor lock has occurred immediately before system startup, the controller 42 increases the length of time of mask processing, so that the controller 42 can help to prevent, by performing mask processing, an erroneous diagnosis from being made. In a case where it is estimated that motor lock has not occurred immediately before system startup, the controller 42 reduces the length of time of mask processing, so that the controller 42 can perform diagnostic processing in the temperature rise period starting immediately after system startup. Thus, the controller 42 can ensure a long diagnostic time for making a linearity diagnosis, for which it is difficult to ensure a diagnostic time.

Furthermore, the controller 42 of the diagnostic apparatus 40 according to the present embodiment switches the length of time of mask processing on the basis of detected values from the first temperature sensor device 21*a* and the second temperature sensor device 21*b* of the temperature sensor 21. Alternatively, the controller 42 switches the length of time of mask processing on the basis of detected values from the temperature sensor devices 23*a*1 to 23*c*2 of the temperature sensor 23. Thus, the controller 42 does not use additional information in order to switch the length of time of mask processing, so that simple processing for switching the above-described length of time can be realized.

Note that, in the above-described embodiments, an example has been described in which the controller 42 switches the length of time of mask processing simply on the basis of outputs from the temperature sensors 21 and 23. However, for example, if information correlated to presence or absence of motor lock immediately before system startup is available, the controller 42 may switch the length of time of mask processing using the correlated information at the same time. Alternatively, the controller 42 may switch the length of time of mask processing simply on the basis of the above-described correlated information without using outputs from the temperature sensors 21 and 23.

Moreover, the controller 42 of the diagnostic apparatus 40 according to the present embodiment switches the length of time of mask processing on the basis of the level of discrepancy between detected values of different phases among detected values of phases from the temperature sensors 21 and 23. Thus, the controller 42 can distinguish, with high accuracy, between a case where motor lock has occurred immediately before system startup and a case where motor lock has not occurred immediately before system startup, and the length of time of mask processing can be switched to the length of time appropriate for a corresponding one of the cases.

Furthermore, in a case where the above-described level of discrepancy is greater than or equal to a certain threshold, the controller 42 of the diagnostic apparatus 40 according to the present embodiment sets the duration of mask processing to the first length of time, which is long. In contrast, in a case where the above-described level of discrepancy is less than the threshold, the controller 42 sets the duration of mask processing to the second length of time, which is short. Thus, in a case where motor lock has occurred immediately before system startup, the controller 42 can help to prevent, by performing mask processing for the first length of time, an erroneous diagnosis from being made, the first length of time being long. In a case where motor lock has not occurred immediately before system startup, mask processing is completed in the second length of time, which is short, and thus the controller 42 can make a linearity diagnosis in a period immediately after system startup and appropriate for diagnosis. Thus, the controller 42 can have an effect in that a longer time can be ensured as a diagnostic time regarding linearity.

Furthermore, the controller 42 of the diagnostic apparatus 40 according to the present embodiment makes diagnoses regarding shifts of the temperature sensors 21 and 23 and diagnoses regarding the linearity of the temperature sensors 21 and 23 on the basis of outputs from the temperature sensors 21 and 23. Regarding these diagnostic items, it is difficult to make accurate diagnoses due to occurrence of motor lock, and these diagnostic items are items for which diagnoses can be made under limited conditions and for which it is not easy to ensure a diagnostic time. Thus, switching the above-described length of time of mask processing is especially effective for the diagnostic apparatus 40, which makes diagnoses regarding the items.

The embodiment of the disclosure has been described above. However, the disclosure is not limited to the above-described embodiments. For example, in the above-described embodiments, an example has been described in which the diagnostic apparatus 40 makes diagnoses of both the temperature sensor 21 of the drive motor 10 and the temperature sensor 23 of the inverter 12. However, it is sufficient that the diagnostic apparatus 40 be configured to make a diagnosis of at least one out of the temperature sensors 21 and 23. In the above-described embodiments, the level of discrepancy calculated from outputs from the temperature sensor 21 or the level of discrepancy calculated from outputs from the temperature sensor 23 is described as the level of discrepancy between detected values from the temperature sensors 21 and 23. However, in a case where motor lock has occurred, one coil of the drive motor 10 and a certain pair of elements of the inverter 12 generate large amounts of heat, and the others generate small amounts of heat. Thus, the controller 42 may calculate the level of discrepancy between a detected value of a certain phase from the temperature sensor 21 of the drive motor 10 and a detected value of another phase from the temperature sensor 23 of the inverter 12 as long as the detected values are detected values of different phases.

In the above-described embodiment, an example has been described in which the length of time of mask processing at system startup is switched in two stages. However, the controller 42 may switch the length of time of mask processing in three or more stages or steplessly (continuously). Moreover, examples of the length of time of mask processing switched by the controller 42 may include a zero time. That is, patterns for switching the length of time of mask processing at system startup may include a pattern for not performing mask processing (mask processing is performed for a zero time). In addition, the details described in the embodiments can be changed as appropriate without departing from the gist of the disclosure.

According to an embodiment of the disclosure, even in a case where motor lock has occurred immediately before system startup, the situation can be dealt by performing mask processing. In contrast, in a case where, for example, motor lock has not occurred immediately before system startup and where a situation appropriate for making a diagnosis occurs immediately after system startup, a diagnostic time can be increased by switching the length of time of mask processing. Thus, the number of opportunities to perform diagnostic processing in a situation appropriate for making a diagnosis can be increased. Thus, according to an embodiment of the disclosure, appropriate diagnoses of temperature sensors can be made.

The controller 42 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the controller 42. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 1.

The invention claimed is:

1. An electric vehicle diagnostic apparatus to be installed in an electric vehicle, the electric vehicle comprising temperature sensors disposed at different positions of either a drive motor or an inverter configured to drive the drive motor, the temperature sensors being configured to detect respective temperatures at the different positions, the electric vehicle diagnostic apparatus comprising:

a controller configured to, during a startup period of the electric vehicle:

calculate a discrepancy between detected values of the temperature sensors;

determine whether the discrepancy is greater than or equal to a discrepancy threshold;

set a duration of a mask process to a first length of time in response to determining that the discrepancy is greater than or equal to the discrepancy threshold;

set the duration of the mask process to a second length of time shorter than the first length of time in response to determining that the discrepancy is less than the discrepancy threshold;

execute the mask process during which the controller refrains from executing a predetermined diagnosis of the temperature sensors; and resume the predetermined diagnosis of the temperature sensors upon expiration of the duration of the mask process, wherein the predetermined diagnosis includes at least one of a shift abnormality diagnosis and a linearity abnormality diagnosis, wherein the shift abnormality diagnosis is a diagnosis that determines that a shift abnormality is present, based on a condition that an output difference between or among the temperature sensors is greater than or equal to a predetermined threshold and continues for at least a predetermined duration, wherein the linearity abnormality diagnosis is a diagnosis that determines that a linearity abnormality is present, based on (i) a difference between rates of change in outputs from the temperature sensors being greater than or equal to a predetermined threshold, (ii) the difference continuing for at least a predetermined duration, and (iii) the outputs changing under a predetermined change condition, wherein determining that the discrepancy is greater than or equal to the discrepancy threshold is indicative of motor lock immediately before system startup, and wherein the mask process is executed to refrain from executing the shift abnormality diagnosis and the linearity abnormality diagnosis when determining that the discrepancy is greater than or equal to the discrepancy threshold, wherein, after release of motor lock of the drive motor, the controller is configured to set the duration of the mask process to a third length of time that is longer than the first length of time and the second length of time, and wherein the drive motor includes a plurality of coils corresponding to different current phases, and the temperature sensors are disposed to detect temperatures of respective coils corresponding to the different current phases at different positions adjacent to respective ones of the plurality of coils, or wherein the inverter includes a plurality of switching elements corresponding to different current phases, and the temperature sensors are disposed to detect temperatures of respective switching elements corresponding to the different current phases at different positions adjacent to respective ones of the plurality of switching elements.

2. The electric vehicle diagnostic apparatus according to claim 1, wherein the temperature sensors are configured to output detected values of the temperatures of the coils of the drive motor through which different phase currents flow, or detected values of the temperatures of switching elements of the inverter through which different phase currents flow, and the controller is configured to adjust the duration of the mask process based on a level of the discrepancy between detected values of the temperature sensors corresponding to different phases.

* * * * *